(12) United States Patent
Yamashita

(10) Patent No.: US 8,699,820 B2
(45) Date of Patent: Apr. 15, 2014

(54) IMAGE PROCESSING APPARATUS, CAMERA APPARATUS, IMAGE PROCESSING METHOD, AND PROGRAM

(75) Inventor: Noriyuki Yamashita, Tokyo (JP)

(73) Assignee: Sony Corporation, Tokyo (JP)

( * ) Notice: Subject to any disclaimer, the term of this patent is extended or adjusted under 35 U.S.C. 154(b) by 1412 days.

(21) Appl. No.: 11/977,403

(22) Filed: Oct. 24, 2007

(65) Prior Publication Data

US 2008/0118155 A1    May 22, 2008

(30) Foreign Application Priority Data

Nov. 6, 2006  (JP) ................................. 2006-300917

(51) Int. Cl.
| | |
|---|---|
| *G06K 9/00* | (2006.01) |
| *G06K 9/40* | (2006.01) |
| *G06K 9/46* | (2006.01) |
| *G06K 9/66* | (2006.01) |
| *G06K 9/36* | (2006.01) |
| *H04N 7/00* | (2011.01) |
| *H04N 5/225* | (2006.01) |
| *G09G 5/00* | (2006.01) |

(52) U.S. Cl.
USPC ........... 382/285; 382/154; 382/190; 382/268; 382/284; 348/38; 348/218.1; 345/585

(58) Field of Classification Search
USPC ......... 382/100, 154, 162, 181, 190, 209, 254, 382/260, 264, 266, 268, 274–276, 278, 382/284–285; 375/240.01; 348/38, 218.1; 345/418–419, 585
See application file for complete search history.

(56) References Cited

U.S. PATENT DOCUMENTS

| | | | |
|---|---|---|---|
| 6,018,349 A * | 1/2000 | Szeliski et al. ................ | 345/629 |
| 6,075,905 A | 6/2000 | Herman et al. | |
| 7,015,954 B1 * | 3/2006 | Foote et al. ................ | 348/218.1 |

(Continued)

FOREIGN PATENT DOCUMENTS

| | | |
|---|---|---|
| JP | 07-152895 A | 6/1995 |
| JP | 2001-358933 | 6/2000 |

(Continued)

OTHER PUBLICATIONS

Shum and Szeliski,"Correction to Construction of Panoramic Image Mosaics with Global and Local Alignment", International Journal of Computer Vision 48(2), 151-152, 2002 Kluwer Academic Publishers.*

(Continued)

*Primary Examiner* — Randolph I Chu
*Assistant Examiner* — Nathan Bloom
(74) *Attorney, Agent, or Firm* — Wolf, Greenfield & Sacks, P.C.

(57) ABSTRACT

An image processing apparatus includes a combining processing unit combining plural images into a piece of combined image. The plural images is taken by a plurality of image-capturing from a certain position to different plural directions. The combining processing unit configured to extract a parameter by performing block matching processes at individual boundaries in such a manner that boundaries a plurality of selected images are disposed in overlapping relation, perform block matching processes of all boundaries to be combined based on the parameter, evaluate results of the block matching processes with respect to all the boundaries, and perform combining the images to reduce errors by updating an optical axis direction so as to reduce errors in all the boundaries.

18 Claims, 10 Drawing Sheets

(56) References Cited

U.S. PATENT DOCUMENTS

| | | | |
|---|---|---|---|
| 7,076,116 B2* | 7/2006 | Horie | 382/284 |
| 2003/0063816 A1* | 4/2003 | Chen et al. | 382/284 |
| 2005/0226531 A1* | 10/2005 | Silverstein et al. | 382/284 |
| 2006/0023276 A1* | 2/2006 | Jeon | 358/540 |
| 2007/0014347 A1* | 1/2007 | Prechtl et al. | 375/240.01 |

FOREIGN PATENT DOCUMENTS

| | | |
|---|---|---|
| JP | 2001-245133 A | 9/2001 |
| JP | 2001-258933 A | 9/2001 |
| JP | 2002-514359 T | 5/2002 |
| JP | 2003-259110 A | 9/2003 |
| JP | 3557168 A | 5/2004 |
| JP | 2005-092822 A | 4/2005 |
| JP | 2006-121329 A | 5/2006 |

OTHER PUBLICATIONS

Shum and Szeliski,"Construction of Panoramic Image Mosaics with Global and Local Alignment", International Journal of Computer Vision, May 1998, 1999 Kluwer Academic Publishers.*

Szeliski, "Image Alignment and Stitching: A Tutorial", Foundations and Tredns in Computer Graphics and Vision vol. 2, No. 1 (2006) 1-104, DOI: 10.1561/0600000009.*

Peleg, S.; Ben-Ezra, M.; Pritch, Y.; , "Omnistereo: panoramic stereo imaging," Pattern Analysis and Machine Intelligence, IEEE Transactions on , vol. 23, No. 3, pp. 279-290, Mar. 2001 doi: 10.1109/34. 910880 URL: http://ieeexplore.ieee.org/stamp/stamp.jsp?tp=&arnumber=910880&isnumber=19655.*

Erturk, S.; , "Digital image stabilization with sub-image phase correlation based global motion estimation," Consumer Electronics, IEEE Transactions on , vol. 49, No. 4, pp. 1320-1325, Nov. 2003.*

Dae-Hyun Kim, Yong-In Yoon, Jong-Soo Choi, An efficient method to build panoramic image mosaics, Pattern Recognition Letters, vol. 24, Issue 14, Oct. 2003, pp. 2421-2429.*

Nielsen, F.; Yamashita, N.; , "CLAIRVOYANCE: A Fast and Robust Precision Mosaicing System for Gigapixel Images," IEEE Industrial Electronics, IECON 2006—32nd Annual Conference on , vol., No., pp. 3471-3476, Nov. 6-10, 2006.*

Ross, Arun, Samir Shah, and Jidnya Shah. "Image versus feature mosaicing: A case study in fingerprints." Proceedings of SPIE. vol. 6202. 2006.*

* cited by examiner

Peak

IMAGE PROCESSING APPARATUS, CAMERA APPARATUS, IMAGE PROCESSING METHOD, AND PROGRAM

CROSS REFERENCES TO RELATED APPLICATIONS

The present invention contains subject matter related to Japanese Patent Application JP 2006-300917 filed in the Japanese Patent Office on Nov. 6, 2006, the entire contents of which are incorporated herein by reference.

BACKGROUND OF THE INVENTION

1. Field of the Invention

The present invention relates to an image processing apparatus having a function of combining a plurality of images, a camera apparatus, an image processing method and a program.

2. Description of Related Art

A method of imaging a plurality of times in different directions from a point by setting the camera to a telescope is known to obtain a wide-angle and high-definition photograph.

As a method of combining the images, there have been proposed methods where a lens correction coefficient is found, and combining processing is performed based on the lens correction coefficient. This is disclosed in, for example, Japanese Patent No. 3557168 (hereinafter referred to as "patent document 1"), Japanese Unexamined Patent Application Publications No. 2003-259110 (hereinafter referred to as "patent document 2") and Japanese Unexamined Patent Application Publication No. 2001-358933 (hereinafter referred to as "patent document 3").

In the technique disclosed in the patent document 1, based on two images taken, the coordinates of a plurality of corresponding points between the two images are found, and a coefficient of geometrical transform between the two images are calculated. Then, a lens distortion coefficient is calculated based on the coordinates of the corresponding points and the coefficient of geometrical transform.

In the technique disclosed in the patent document 2, the tilting angles of input images with respect to paper surface and an object are found, and the tilting of the respective input images are corrected based on these tilting angles. An overlapping position between the two images is detected by using the corrected input images, or images from which the data amount of the corrected input images have been decreased. The two input images are connected at the detected overlapping position.

In the technique disclosed in the patent document 3, reference points of an image combining are specified for each of a plurality of image data, and the scales and the rotation angles of the images are calculated based on the reference points. The image data are reduced and rotated for connection by using the calculated scale and rotation angle.

SUMMARY OF THE INVENTION

In the abovementioned techniques, the finding of the lens distortion correction coefficient requires an operation called calibration, which is complicated.

Further, these techniques are intended to combine two images. When a large number of, such as several thousands pieces of, images are connected to each other, instead of a row of images, errors may be accumulated to develop so-called wrinkle. It is therefore difficult to perform precise combining. There is also remarkable color non-uniformity due to lens characteristics.

It is desirable to provide an image processing apparatus, a camera apparatus, an image processing method and a program capable of performing precise combining, irrespective of the number of images combined, and also suppressing the occurrence of color non-uniformity.

In accordance with a first aspect of the present invention, there is provided an image processing apparatus including a combining processing unit combining plural images into a piece of combined image, the plural images being taken by a plurality of image-capturing from a certain position to different plural directions. The combining processing unit (i) extracts a parameter by performing block matching processes in such a manner that boundaries of a plurality of selected images are disposed in overlapping relation (ii) performs, based on the parameter, block matching processes for all boundaries to be combined, (iii) evaluates result of the block matching processes with respect to all the boundaries, and (iv) performs combining of images to reduce errors by updating an optical axis direction so as to reduce errors in all the boundaries.

In accordance with a second aspect of the present invention, there is provided a camera apparatus including: an image-capturing device; an optical system for focusing an object image onto the image-capturing device; and an image processing apparatus for processing an output image signal of the image-capturing device. The image processing apparatus has a combining processing unit combining plural images into a piece of combined image, the plural images being taken by a plurality of image-capturing from a certain position to different plural directions. The combining processing unit (i) extracts a parameter by performing block matching processes in such a manner that boundaries of a plurality of selected images are disposed in overlapping relation, (ii) performs, based on the parameter, block matching processes for all boundaries to be combined, (iii) evaluates result of the block matching processes with respect to all the boundaries, and (iv) performs combining of images to reduce errors by updating an optical axis direction so as to reduce errors in all the boundaries.

In accordance with a third aspect of the present Invention, there is provided an image processing method of combining plural images into a piece of combined image, the plural images being taken by a plurality of image-capturing from a certain position to different plural directions. The method includes: extracting a parameter by performing block matching processes in such a manner that boundaries of a plurality of selected images are disposed in overlapping relation; performing, based on the parameter, block matching processes for all boundaries to be combined; evaluating results of the block matching processes with respect to all the boundaries; and performing combining of the images to reduce errors by updating an optical axis direction so as to reduce errors in all the boundaries.

In accordance with a fourth aspect of the present invention, there is provided a program for combining plural images into a piece of combined image, the plural images being taken by a plurality of image-capturing from a certain position to different plural directions. The program causes a computer to execute: the function of extracting a parameter by performing block matching processes in such a manner that boundaries of a plurality of selected images are disposed in overlapping relation; the function of performing, based on the parameter, block matching processes for all boundaries to be combined; the function of evaluating results of the block matching processes with respect to all the boundaries; and the function of performing combining of the images to reduce errors by updating an optical axis direction so as to reduce errors in all the boundaries.

According to embodiments of the present invention, in the combining processing unit, the block matching process is performed at individual boundaries in such a manner that boundaries of a plurality of selected images are disposed in overlapping relation. Then, a parameter is extracted by performing block matching process at each of the boundaries. Based on the extracted parameter, the block matching process is performed with respect to all the boundaries to be combined. The evaluation of the results of the block matching processes are made on all the boundaries, and the combining is performed to reduce errors by updating the optical axis direction so as to reduce the errors in all the boundaries.

This enables precise combining and also suppresses the occurrence of color non-uniformity, irrespective of the number of images combined.

BRIEF DESCRIPTION OF THE DRAWINGS

These and other features and aspects of the invention are set forth in detail below with referent of the accompanying drawings in the following detailed description of the embodiments.

DETAILED DESCRIPTION OF THE EMBODIMENTS

Embodiments of the present invention will be described with reference to the accompanying drawings.

Figure 1:
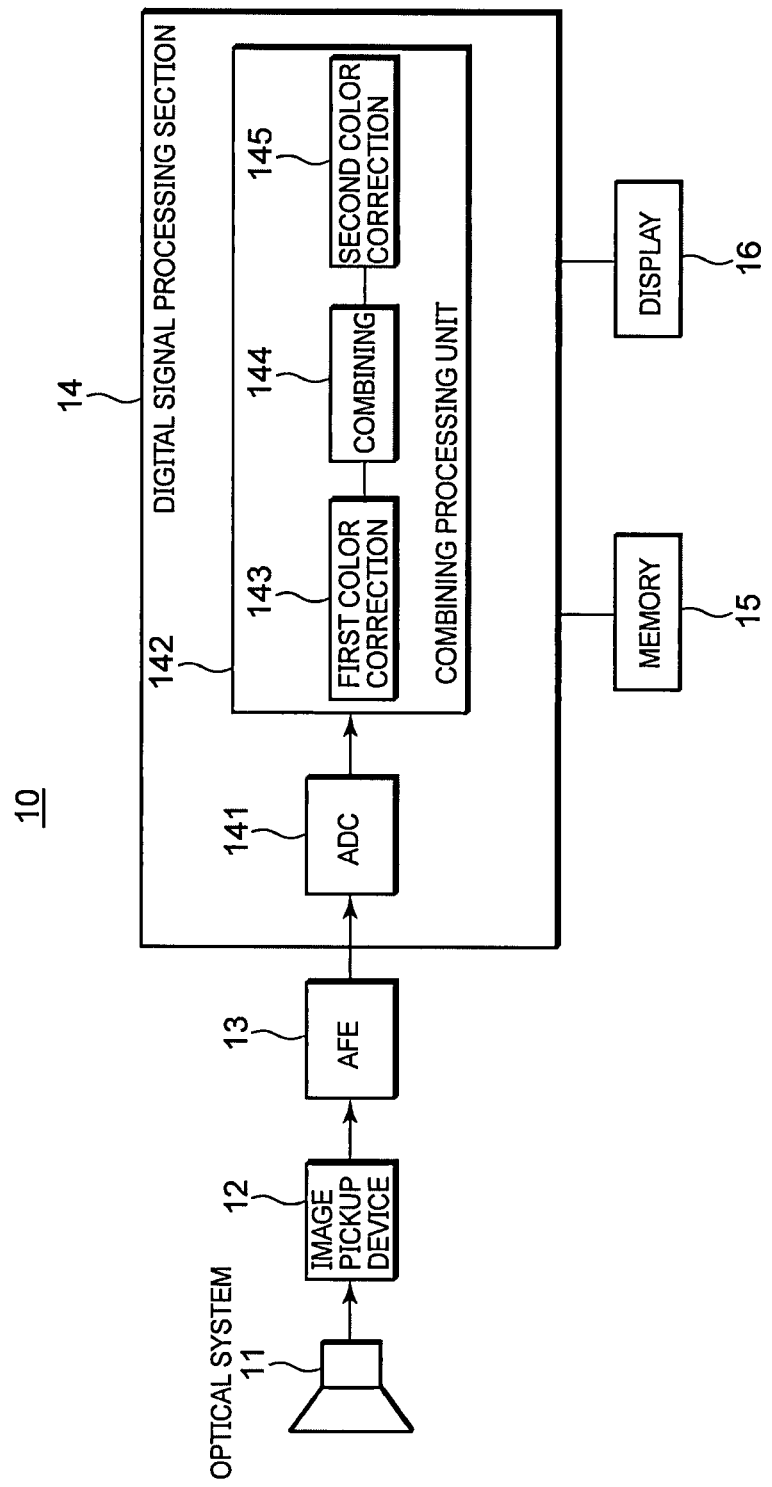
FIG. 1 is a block diagram showing an example of the configuration of a camera apparatus employing an image processing apparatus according to a preferred embodiment of the present invention.

FIG. 1 is a block diagram showing an example of the configuration of a camera apparatus employing an image processing apparatus according to an embodiment of the present invention.

Figure 2:
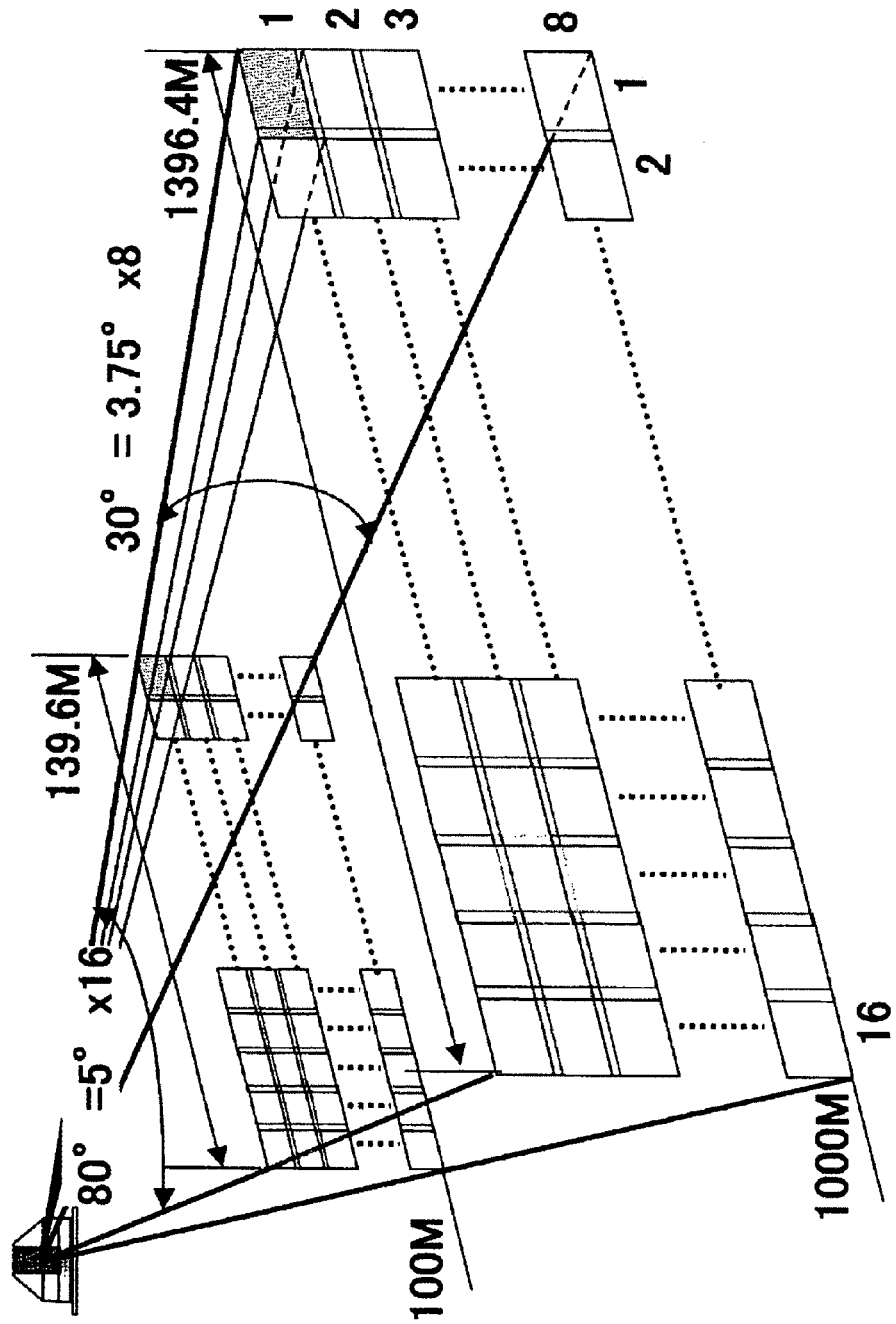
FIG. 2 is a diagram conceptually showing the case of performing a wide-angle shooting by the camera apparatus of the embodiment.

As shown in FIG. 2, a camera apparatus 10 obtains a large number of images (16×8=128 pieces in FIG. 2) by automatically or manually shooting a plurality of times in different directions from a point. The camera apparatus 10 performs combining of a large number of, e.g. several thousands of, images precisely without wrinkle.

The camera apparatus 10 of an embodiment of the present includes an optical system 11, an image-capturing device 12, an analog front-end circuit 13, a digital signal processing section (DSP) 14, an image memory 15, and a display 16.

The optical system 11 focuses an object image onto an image-capturing plane of the image-capturing device 12.

The image-capturing device 12 is configured by, for example, a CCD (charge coupled device) or a CMOS (complimentary metal oxide semiconductor) device. Optical sensors arranged in a matrix on a semiconductor substrate detect the object image obtained by the optical system 11, and generate a signal charge. The image-capturing device 12 reads the signal charge through a vertical signal line and a horizontal line, and then outputs the image signal of the object.

The AFE circuit 13 removes, for example, a fixed pattern noise contained in the image signal from the image-capturing device 12, and stabilizes the signal level by the operation of automatic gain control, and outputs the resulting image signal to the digital signal processing section 14.

The digital signal processing section 14 is a circuit for performing color correction processing, combining processing of a plurality of images, automatic exposure control and auto white balance control etc, with respect to output signals from the AFE circuit 13.

The digital signal processing unit 14 has an analog digital converter (ADC) 141 for mainly converting analog image signals from the AFE circuit 13, to digital signals, as well as a precise combining processing unit 142 configured to enable precise combining, without wrinkle, of a large number of images taken a plurality of times in different directions from a point.

The precise combining processing unit 142 includes a first color correction functioning section 143, a combining functioning unit 144, and a second color correction functioning unit 145.

Thus, the signal processing section 14 of the present embodiment has a function (e.g. software) by which the images taken a plurality of times in different directions from a point can be precisely combined into a piece of image by correcting color non-uniformity.

The characteristic functions of the precise combining of the present embodiment will be specifically described below.

The first color correction functioning unit 143 performs at least three blocks matching (BM) for each boundary when extracting a parameter such as a lens distortion correction coefficient, and performs combining for boundaries in at least four pieces, thereby determining a lens distortion correction coefficient to permit precise combining. In other words, the first color correction functioning unit 143 extracts from an original image a parameter, such as a lens distortion correction coefficient.

Subsequently, the first color correction functioning section 143 uniformly performs a correction of ambient light reduction, contrast enhancement, saturation enhancement and gamma correction with respect to all partial images.

After the first color correction functioning unit 143 determines the parameter such as the lens distortion correction coefficient and performs the correction of ambient light reduction, contrast enhancement, saturation enhancement and gamma correction, the combining functioning unit 144 performs BM at least one (three in the present embodiment) for each of all boundaries. Then, the unit 144 performs precise combining of a plurality of images by simultaneously evaluating the results of the BM of all the boundaries, and updating the optical axis direction so as to reduce the errors in all the boundaries.

The second color correction functioning section 145 performs color (color non-uniformity) correction, which is performed independently for each partial image in order to reduce the color difference between adjacent images in the plurality of images precisely combined by the combining functioning unit 144.

The second color correction functioning section 145 also performs color correction for reduction the color discontinuity between adjacent images to below a detection limit.

The theoretical concept of precise combining processing in the precise combining processing unit 142 will be described below.

The present embodiment basically employs phase correlation technique based on Fourier analysis.

That is, the employed technique is based on Fourier shift theorem that the shift of a spatial function is changed only in the phase of a spectrum region.

Specifically, two functions $f_1$ and $f_2$ should satisfy the following relationship.

$$f_2(x,y)=f_1(x+x_t, y+y_t)$$

Further there is the following spectrum characteristic.

$$F_2(u,v)=F_1(u,v)\exp(-2\pi i(ux_t+vy_t))$$

The above equation can be written by using cross-power spectrum (CPS), as follows.

$$\underbrace{\frac{F_1(u,v)F_2^*(u,v)}{|F_1(u,v)F_2^*(u,v)|}}_{Cross-power\ spectrum} = \exp(2\pi i(ux_t+vy_t)),$$

where $F_2^*$ is a conjugate function of a complex function $F_2$.

Figure 3A:
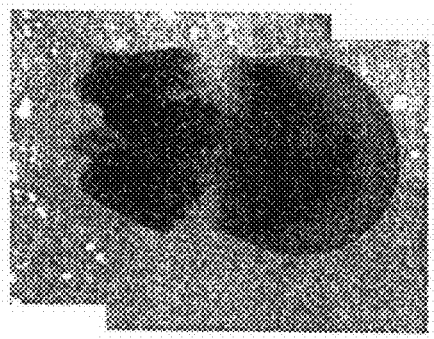
FIG. 3 is a diagram showing a stitching image in a translation using cross power spectrum (CPS)
Figure 3B:
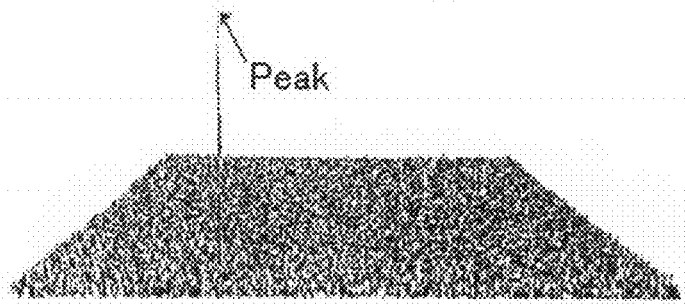

In fact, an image is bit noise such as cross-power spectrum of two images, as shown in FIGS. 3A and 3B.

It is therefore desirable to seek a peak of the CPS and derive a translation parameter $(x_t, y_t)$ from the peak.

FIGS. 3A and 3B are diagrams showing stitching images in the translation using the cross-power spectrum (CPS).

FIG. 3A shows the result of the stitching of two images. A two-dimensional translation can be obtained by detecting the peak of the CPS, as shown in FIG. 3B. Here, if the CPS is readable, the images are completely matched.

Since it is difficult to detect a maximum peak in an image with much noise, some peaks may be selected.

Next, the principle of extraction of a parameter by using block matching (BM) process will be described with reference to FIGS. 4 to 11.

The BM includes the function of deriving the peak of the abovementioned cross-power spectrum (CPS).

Figure 4:
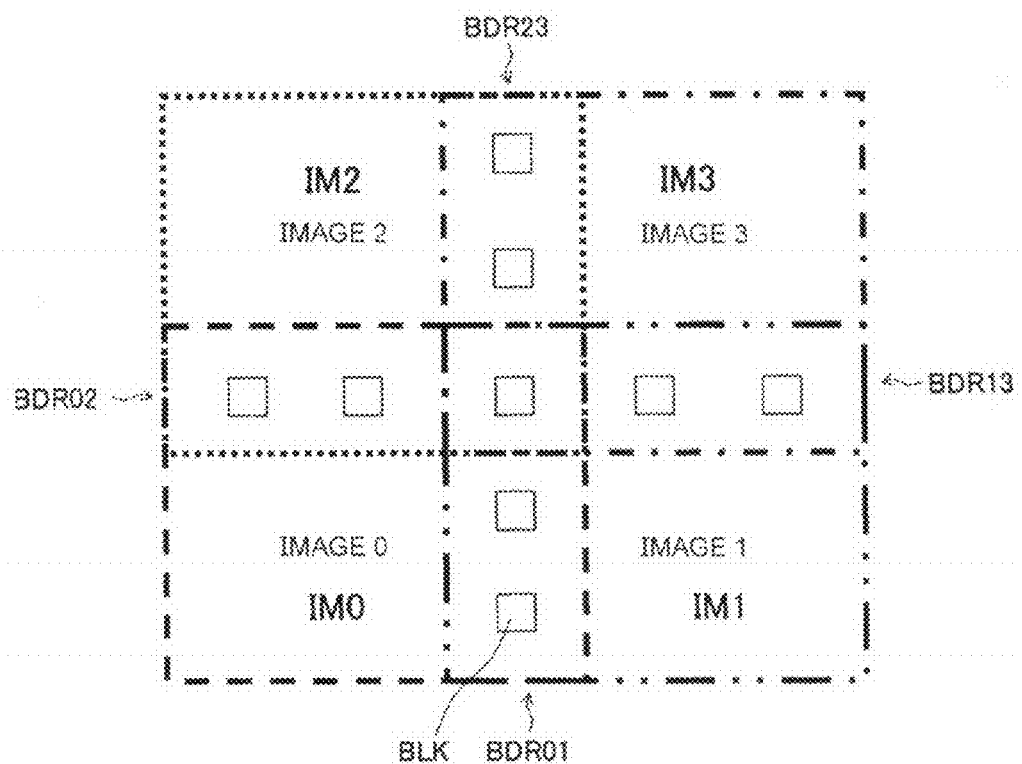
FIG. 4 is a diagram for explaining the process of extracting a parameter by block matching (BM) process, specifically showing the process of selecting four images of good condition.

Referring now to FIG. 4, four images IM0, IM1, IM2 and IM3 of good condition are selected.

Assuming, for example, that the image arranged below left viewing the drawing is the zero-th image IM0, its right-hand one is the first image IM1, the upper left one is the second image IM2, and its right-hand one is the third image IM3. These images IM0 to IM3 are arranged to include an overlapping portion in the boundary between the adjacent images.

In FIG. 4, rectangles arranged in the boundary areas are blocks BLK.

Thus, the BM is performed under the above-mentioned condition of arrangement.

Then, information of lens distortion, angles of view and tilting angles are obtained from four boundaries BDR01, BDR02, BDR13 and BDR23 in the lower, left, right and upper regions, respectively.

The BM will further be described.

Figure 5:
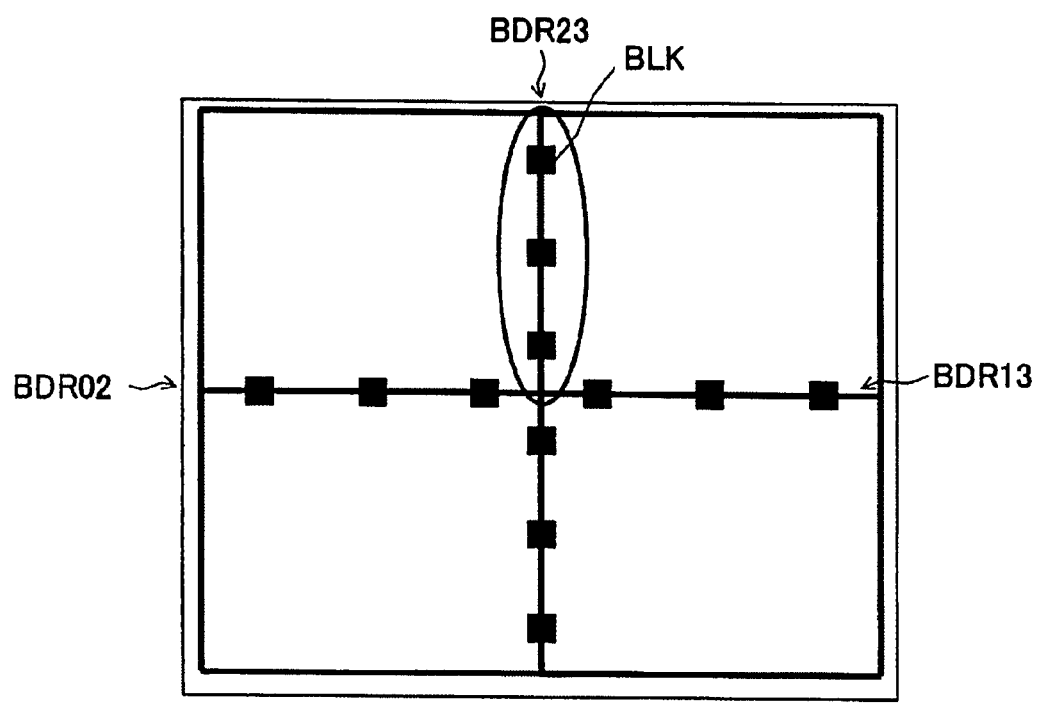
FIG. 5 is a diagram for explaining the process of extracting a parameter by BM, specifically showing an example of performing BM at three positions in a boundary.

The BM is performed with respect to three positions in a boundary, as shown in FIG. 5.

Figure 6:
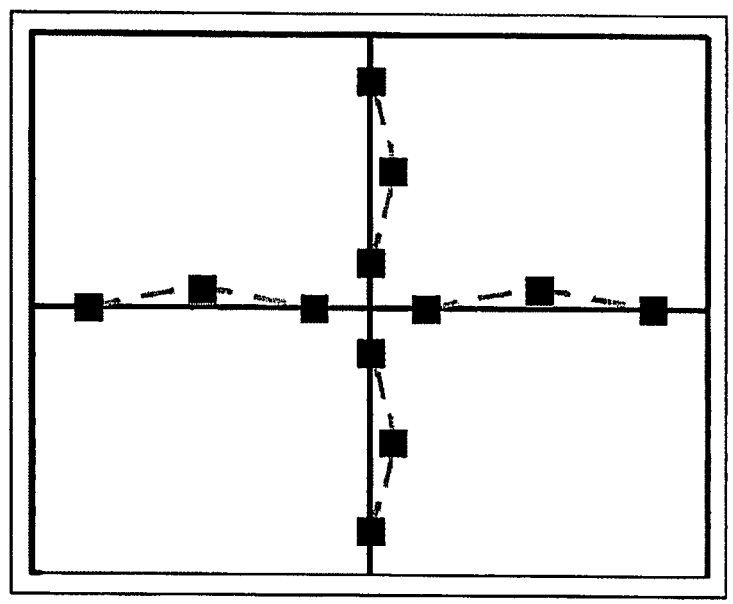
FIG. 6 is a diagram for explaining the process of extracting a parameter by BM, specifically showing that the presence of lens distortion leads to arched results of the BM.

The presence of lens distortion leads to arched results of the BM, as shown in FIG. 6.

Figure 7:
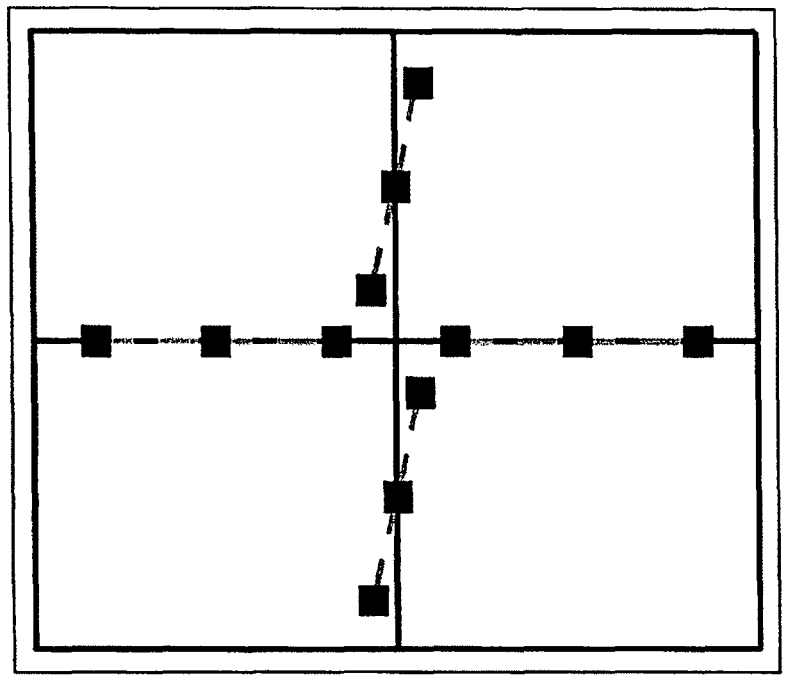
FIG. 7 is a diagram for explaining the process of extracting a parameter by BM, specifically showing a case where an improper tilting angle causes a right-to-left error.

Any improper tilting angle causes a lateral tilting error in the result of the BM, as shown in FIG. 7.

Figure 8:
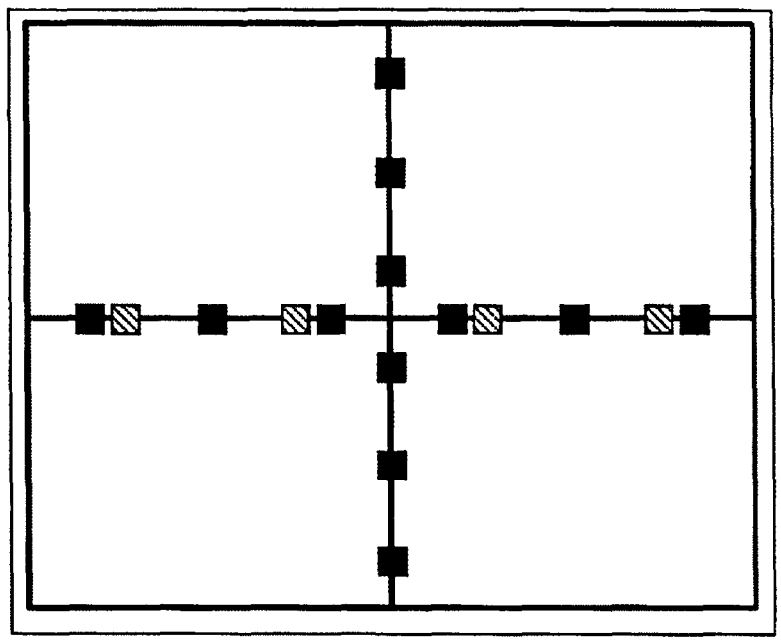
FIG. 8 is a diagram for explaining the process of extracting a parameter by BM, specifically showing a case where a lateral deviation is generated by the presence of vertical expansion and contraction in the right and left boundaries.

When the center of lens distortion is deviated vertically, lateral expansion and contraction occur in the upper and lower boundaries, as shown in FIG. 8. The vertical expansion and contraction in the right and left boundaries result from a lateral deviation of the center of lens distortion.

Figure 9:
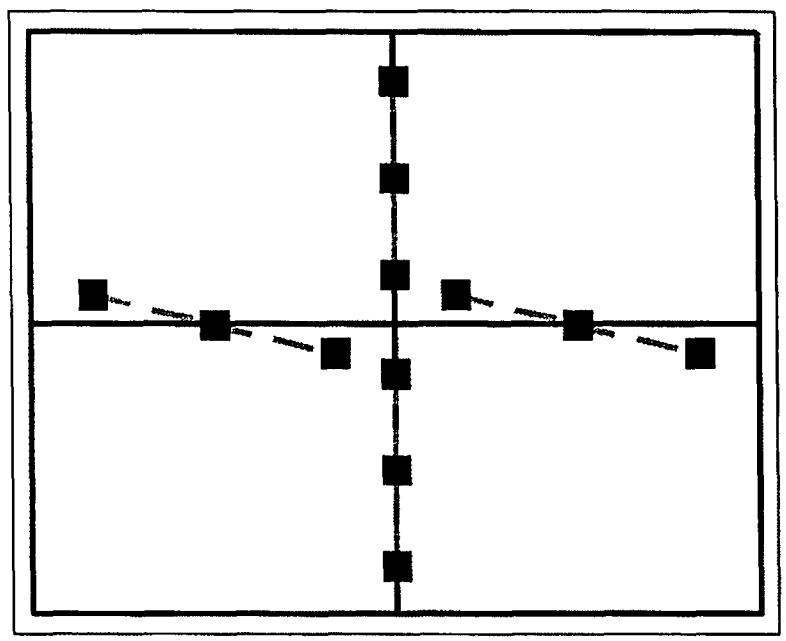
FIG. 9 is a diagram for explaining the process of extracting a parameter by block matching (BM) process, specifically showing an example of an error generated in the rotation of an image.

When the image is rotated upward, a vertical tilting error occurs as shown in FIG. 9. That is, FIG. 9 shows the result when the camera is not oriented to the front with respect to a mechanical tilting axis.

Various parameters are determined to minimize these errors.

This enables the errors to be reduced even if any four pieces are connected together.

For example, fast phase correlation matching is applied to perform the corresponding BM in the image. The respective parameters can be quantified by obtaining a vector shift $(x_{ij}, y_{ij})$, and by analyzing the behavior of shifts of the three blocks.

Figure 10A:
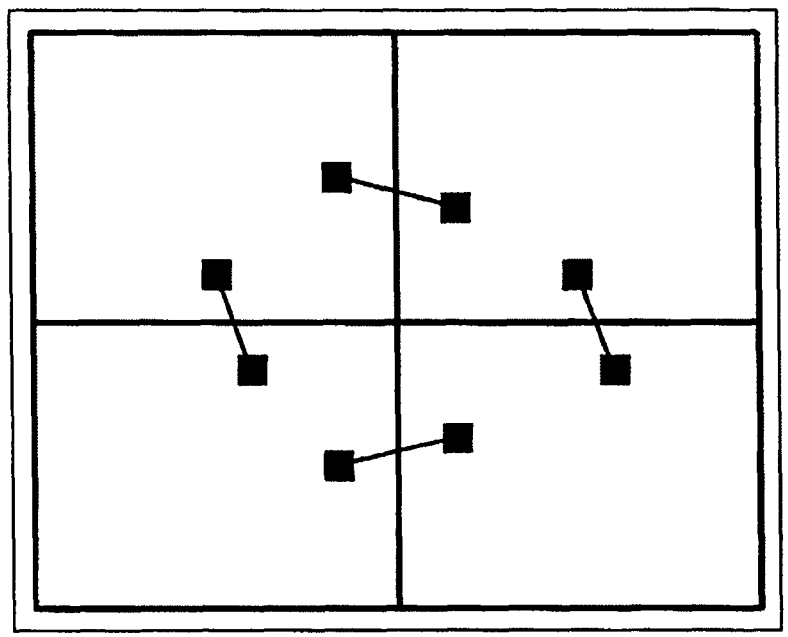
FIGS. 10A and 10B are diagrams for explaining the process where after the process of extracting a parameter by BM, errors can be minimized by performing expansion to a large number of pieces and translation.
Figure 10B:
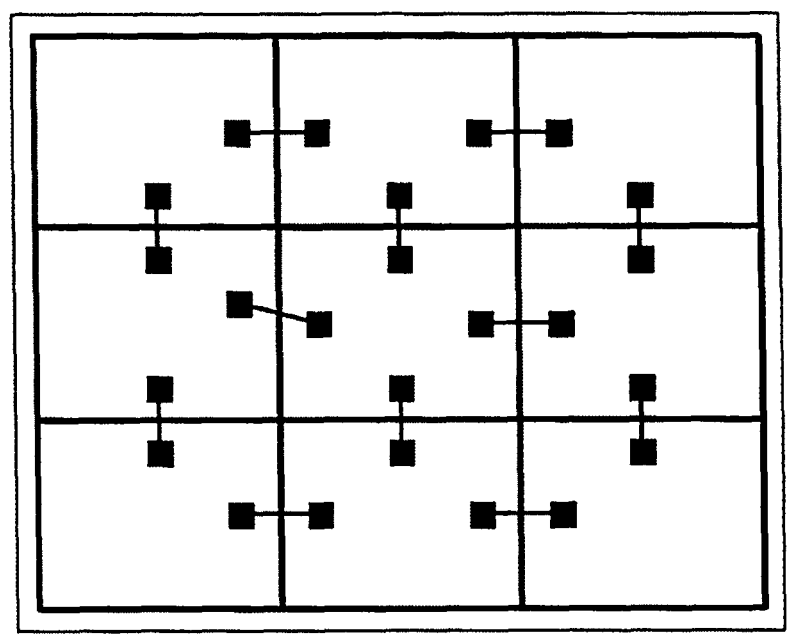

After performing the BM of the abovementioned four pieces, the precise combining of the plurality of images is executed by performing an expansion to a large number of pieces, and simultaneous parallel evaluation of the results of the BM with respect to all the boundaries, and by updating the optical axis direction so as to reduce the errors in all the boundaries, as shown in FIGS. 10A and 10B.

In this case, a reference image is determined, and other images are parallel-translated (moved in parallel) to converge at such positions as to minimize the errors.

The precise combining processing is performed according to the following basic processing, which is itemized as below.

An optimum position is found for shift by translations.

In this case, the loop is rotated.

A parameter fxy indicating the total of shift amounts is set to 0.0.

All the upper, lower, right and left (vertical and lateral) images are processed.

The reference image remains unmoved.

The positional relationship with the adjacent images is found from the results of the BM. Based on this, a shift amount is calculated.

The method thereof is as follows. The image directly above and its right neighbor are added, and the image directly below and its left neighbor are subtracted to obtain an average, which is expressed as f[y][x].x, f[y][x].y.

A 80% thereof is added to the central position of the present image, and regarded as the central position of a new image.

The total of the absolute values of the shift amounts of all the images is entered into the fxy.

Calculation is made to confirm how the abovementioned shift improves the vertical and lateral positional relationships.

The fxy has the property (nature) that it becomes small by repeating the abovementioned shift.

In other words, the fxy is converged to the state where no more shift can be performed.

The processing is terminated when the fxy is sufficiently small.

A description will be made of an exemplary embodiment of the specific processing of image combining free from wrinkle even when connecting several thousands of pieces.

It is considered now the case of four pieces of images.

As shown in FIG. 4, it is assumed that the below left image is the zero-th image IM0, its right neighbor is the first image IM1, the upper left one is the second image IM2, and its right neighbor is the third image IM3.

The zero-th image IM0 remains unmoved. That is, the zero-th image IM0 is used as a reference image.

The lateral components of the results of the BM are expressed as bx1[0], bx1[1], bx2[0], and bx2[1].

The vertical components are also processed independently. However, for purposes of description, only the processing of the lateral components will be described below.

The bx1 expresses right and left, and the bx2 expresses above and below. The figure 0 in "[ ]" means below or left.

When the right or upper image with respect to the reference image IM0 is positioned right or above, the BM result is a positive value.

As an extreme example, assuming that there is only one abnormal value, and that bx1[0]=10, bx1[1]=0, bx2[0]=0, and bx2[1]=0.

Considering that there is a lateral 10-pixel deviation in the first row, and other three boundaries have no deviation.

If the position of the first image IM1 is determined by the BM results of the zero-th image IM0 and the first image IM1, the position of the third image IM3 is determined by the BM results of the first image IM1 and the third image IM3, and the position of the second image IM2 is determined by the BM results of the second image IM2 and the third image IM3, a large value of 10 pixels may occur as a wrinkle in the positional relationship between the zero-th image IM0 and the second image IM2.

In the exemplary embodiment, the system of the present embodiment indicates that the influence of an abnormal value "10" is dispersed by 2.5. This processing is executed under a program, part of which will be described later.

An amount to be parallel-translated is found from the positional relationship with an adjacent image by xypos2( ).

For the first time, it is calculated that the first image IM1 should be shifted −5 pixels.

The first image is parallel-translated by move( ).

The actual shift amount is 80% thereof, namely 4 pixels.

The shift amounts of the images IM1, IM2 and IM3 other than the zero-th image IM0 are pox[1]=4, pox[2]=0, and pox[3]=0, respectively.

From this, the BM result bx1[0] is changed from 10 to 6.

Consequently, bx2[1] is changed from 0 to 4.

For the second time, it is calculated that the first image IM1 should be shifted −1 pixel.

It is calculated that the third image IM3 should be shifted −2 pixels.

When a 80% thereof, namely 0.8 is added, pox[1]=4.8.

Subsequently, a similar calculation is continued from the third time to the 32nd time. For the 32nd time, the total of the shift amounts fxy is below 0.001 pixels, and the processing is terminated.

At this time, the number of pixels to be parallel-translated is 7.5, 2.5, and 5.0. The positional relationships of the respective images are changed as follows. That is, bx1[0]=10 is changed to bx1[0]=2.5, bx2[0]=0 is changed to bx1[1]=−2.5, and bx2[1]=0 is changed to bx2[1]=2.5. It can be seen that the errors are dispersed.

List below are the number of times and the values thereof when ii=32, fxy=0.00083, namely fxy is not more than 0.001.

| n | ix | fx[n] | fy[n] |
|---|----|-------|-------|
| 0 | 0 | 0.000000 | 0.000000 |
| 1 | 2 | −0.000244 | 0.000000 |
| 2 | 2 | −0.000244 | 0.000000 |
| 3 | 2 | −0.000344 | 0.000000 |

| n | pox[n] | poy[n] | fz[n] | Number of pixels to be parallel-translated |
|---|--------|--------|-------|---------------------------------------------|
| 0 | 0.00 | 0.00 | | |
| 1 | 7.50 | 0.00 | | |
| 2 | 2.50 | 0.00 | | |
| 3 | 5.00 | 0.00 | | |

The following are part of an example of the program.

```
-- the part of the program (from here)----------------
clrpos( );           // Enter 0 in an amount to be parallel-
translated [pixel] pox[ ], fzx[ ], and rolla[ ].
for (ii=0;ii<1000;ii++){
                     xypos2( );   // Find an amount to be parallel-
translated from the positional relationship with an
adjacent image.
           if (fxy<0.001){break;}
           move( );   // Translation.
     }
fprintf(inf,"ii=1230484, fxy=0.00000    the number of times
and the value thereof ¥n" when fxy is not more than 0.001,
ii,fxy);
     xypos( );             // Find a translation amount from the
positional relationship with an adjacent image.
     move( );              // Translation.
     dsppos( );            // Display a correction amount.
     angle( );             // Convert the correction amount to an
angle, and update qq[n], pp[n].
     dsppos( );            // Display the correction amount.
     dsperr( );            // Display those having a value
exceeding 1 in the error between a pair of small images.
     step( );              // Create a step angle from qq[n],
pp[n]
-- the part of the program (till here)-----------------
```

The following are a main subroutine.

```
--Main subroutine--------------------------
void xypos2( ){ // Find translation amounts fx[n], fy[n]
from the positional relationship with the adjacent image,
// Find a flag fz[n] that cannot be parallel-translated.
```

```
(Delete fprintf)
  int m, n, m2, n2, h, v, ix;
  double cx, cy;
  //fprintf(inf," n   ix    fx[n]    fy[n]¥n");
  fxy=0;
  for (v=0;v<ny;v++){           // about all images
    for (h=0;h<nx;h++){
      m=(nx-1) *v+h;            // right and left boundaries
      n=nx*v+h;                 // upper and lower boundaries
      ix=0;
      if ((0<skip[h][v])||((v==(ny-1)/2)&&(h==(nx-1)/2))){//
The central image and determined flag image remain unmoved.
        fx[n]=0;fy[n]=0;fz[n]=4;   // fz[n] is a flag that
cannot be parallel-translated
        if (skip[h][v]==2){fz[n]=2;} // Determined flag
image is 2.
      }else{
        cx=0;cy=0;
        if (v!=0){              // when not the lowermost row
          n2=n-nx;              // directly below
          if (0<fok2[n2]){
            ix++;
            cx-=bx2[n2];        // subtract that directly below
            cy-=by2[n2];
          }
        }
        if (v!=ny-1){           // when not the top row
          if (0<fok2[n]){
            ix++;
            cx-=bx2[n];         //add its own
            cy+=by2[n];
          }
        }
        if (h!=0){              // when not the leftmost end
          m2=m-1;               // left neighbor
          if (0<fok1[m2]){
            ix++;
            cx-=bx1[m2];        // Subtract left neighbor
            cy-=by1[m2];
          }
        }
        if (h!=nx-1){           // when not the rightmost end
          if (0<fok1[m]){
            ix++;
            cx+=bx1[m];         // add its own
cy+=by1[m];
          }
        }
        if (ix==0){
          fx[n]=0;fy[n]=0;fz[n]=1;
        }else{
          fx[n]=cx/ix;
          fy[n]=cy/ix;
          fz[n]=0;
        }
        fxy+=fabs(fx[n])+fabs(fy[n]);
      }
    }
  }
}
//*****************************************
void move( ){              // Translation.
  int m,n,h,v;
  for (v=0;v<ny;v++){      // central position of image
(pixel)
    for (h=0;h<nx;h++){
      n=nx*v+h;
      if (fz[n]==0{        // when not isolated from
surroundings
        pox[n]+=-fx[n] * 0.8;
        poy[n]+=-fy[n] * 0.8;
      }
    }
  }
  for (v=0;v<ny;v++){      // Lateral positional relationship
    for (h=0;h<nx-1;h++){
      m=nx*v+h;
      n=(nx-1)*v+h;
      bx1[n]+=-(fx[m]-fx[m+1]) * 0.8;
      by1[n]+=-(fy[m]-fy[m+1]) * 0.8;
    }
  }
  for (v=0;v<ny-1;v++){    // Vertical positional
relationship
    for (h=0;h<nx;h++){
      n=(nx)*v+h;
      bx2[n]+=-(fx[n]-fx[n+nx])*0.8;
      by2[n]+=-(fy[n]-fy[n+nx])*0.8;
    }
  }
}
//*****************************************
```

Next, a description will be made of a specific example of the color correction processing of the first color correction functioning section 143 according to the present embodiment.

[Flow of Color Correction Processing]

Ambient light reduction correction coefficients are given to B, G and R, respectively, and second-order, fourth-order and sixth-order are expressed as bk2, bk4, bk6, gk2, gk4, gk6, and rk2, rk4, rk6, respectively.

A fixed amount is expressed as m_bot.

A pixel number is given to a central deviation, and expressed as m_xo, m_yo.

The unit is a pixel number, and it is necessary to finally make a change when applied to an image of equal magnification. Alternatively, ratio may be employed.

A black level and a white level are used to perform contrast enhancement, and expressed as m_black, m_white, respectively.

Gamma is expressed as m_gamma.

Saturation is expressed as m_sat.

The value of a file MEIHOSEI.DAT of a coefficient for individually correcting the brightness of each image is expressed as mei[n][k].

"n" represents an image number; "k" represents the numbers of three colors; and width and height represent the size of an image (unit: pixel).

Pixel values are determined by operating these parameters as follows.

All pixels in all images are processed.

A distance "dist" from a target coordinate (xp, yp) to the center of ambient light reduction characteristics is found.

$$xc=width/2+m\_xo$$

$$yc=height/2+m\_yo$$

$$dist=sqrt((xp-xc)*(xp-xc)+(xp-xc)*(xp-xc))$$

The correction magnification yy[i] for ambient light reduction of each color is as follows.

$$n1=2*dist/height$$

$$n2=n1*n1$$

$$yy[0]=((bk6*n2+bk4)*n2+bk2)*n2+1$$

$$yy[1]=((gk6*n2+gk4)*n2+gk2)*n2+1$$

$$yy[2]=((rk6*n2+rk4)*n2+rk2)*n2+1$$

Pixel values B, G and R are fetched from the image memory before correction.

These are separated into a brightness signal y and color difference signals cb and cr.

$$Y=0.114*B+0.587*G+0.299*R$$

$$cb=B-y$$

$$cr=R-y$$

The saturations of the color difference signals cb and cr are enhanced and converted to B, G and R, respectively.

$$c[0]=m\_sat*cb+y$$

$$c[2]=m\_sat*cr+y$$

$$c[1]=(y-0.114*c[0]0.299*c[2])/0.587$$

A contrast enhancement magnification, gain, is as follows.

$$gain=255/(m\_white-m\_black$$

Contrast enhancement is performed for three colors (k=0 to 2).

$$ch=gain*(c[k]-m\_black$$

When m_gamma is not 1, ch is limited to 0 to 255, and then gamma is corrected as follows.

$$ch=pow(ch/255,1/m\_gamma$$

Next, ambient light reduction correction is made.

$$ch=yy[k]*(ch+m\_bot)-m\_bot$$

Individual brightness correction is made.

$$ch=(1000+mei[n][k]/1000*ch+0.5$$

After ch is limited to 0 to 255, it is converted to the number of 1 bite.

The foregoing processing for the three colors results in a BMP (bit map) after being subjected to the color correction.

In the present embodiment, after performing the foregoing color correction and image combining, as described above, the second color correction functioning unit 145 reduces the color difference between the adjacent images in the plurality of images precisely combined by the combining functioning unit 144. Therefore, the color (color non-uniformity) correction is made independently (individually) with respect to all the partial images.

The second color correction functioning unit 145 also performs color correction for reducing the color discontinuity between the adjacent images to below the detection limit.

The individual color non-uniformity correction will be described below with reference to FIGS. 11 to 15B.

Figure 11:
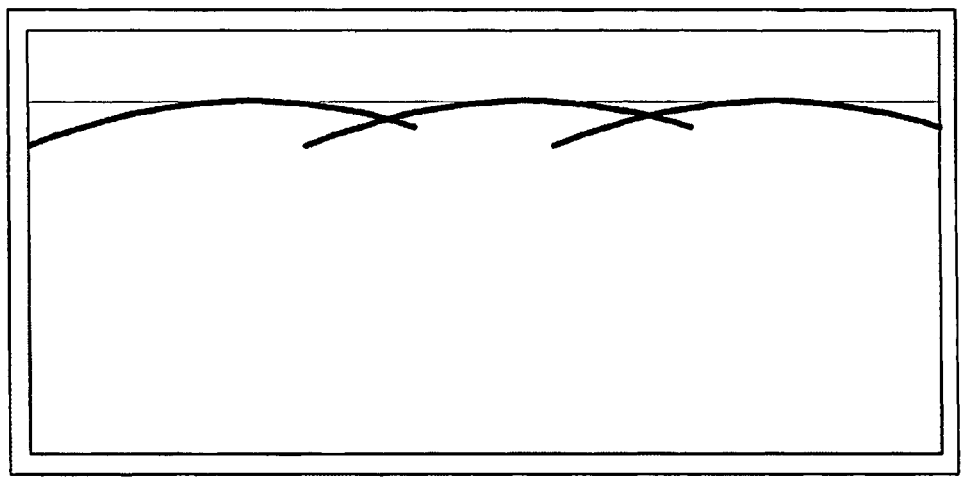
FIG. 11 is a graphical representation of pixel values from the left end to the right end in a sky area of a combined image.

FIG. 11 is a graphical representation of pixel values from the left end to the right end in a sky area of a combined image.

Figure 12:
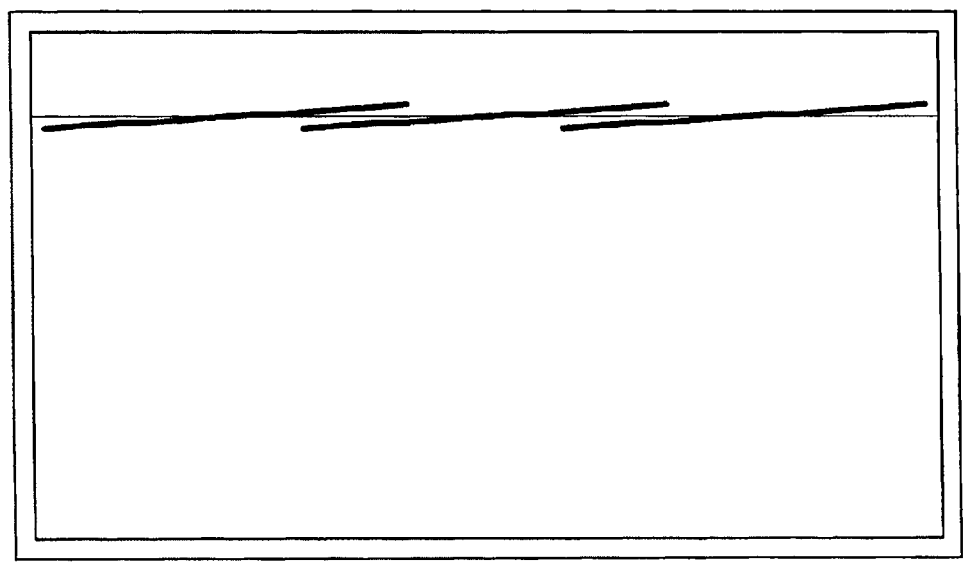
FIG. 12 is a graphical representation after the graph of FIG. 11 is corrected by properly giving a second-order correction coefficient.

FIG. 12 is a graphical representation after the graph of FIG. 11 is corrected by properly giving a second-order correction coefficient.

Figure 13:
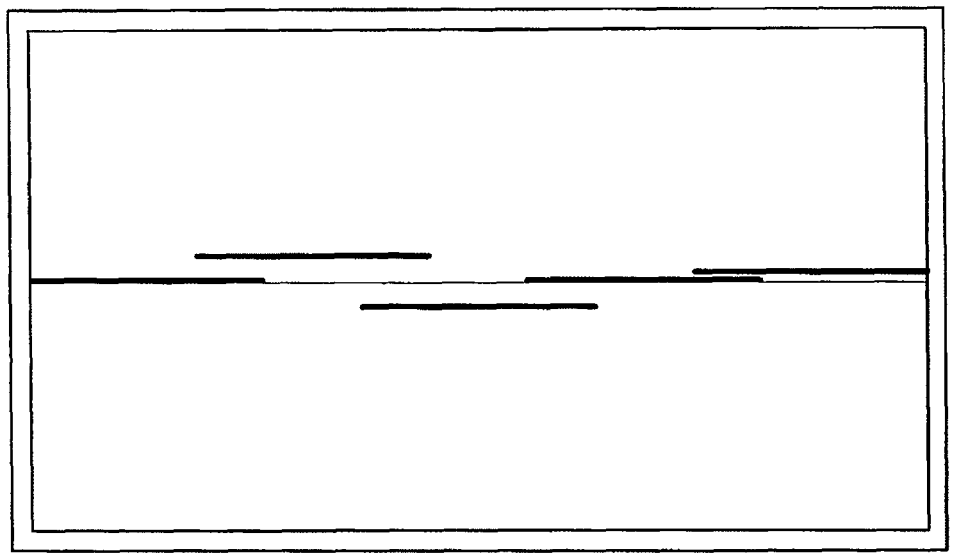
FIG. 13 is a graphical representation after a parameter is added to the graph of FIG. 12.

FIG. 13 is a graphical representation after a parameter is added to the graph of FIG. 12.

As shown in FIG. 11, arched curves representing the ambient light reduction characteristics of the lens can be obtained independently for three colors.

Viewing the graph of FIG. 12 after the correction is made by properly giving a second-order correction coefficient, it is easy to reach an accurate correction coefficient. In this case, all the images are free from arching, however, involve the phenomenon that the right side viewing the drawing is bright.

The reason for this can be considered that the center is deviated, though the ambient light reduction characteristics is handled as a coefficient of the distance from the center of the lens.

The addition of the parameter can eliminate the phenomenon that the right side is bright, as shown in FIG. 13.

However, the colors of the respective images remain different from each other.

For this, by creating correction coefficient files for individual color corrections and giving coefficients for smoothing the graph, the discontinuity of the sky color can be completely vanished.

Figure 14:
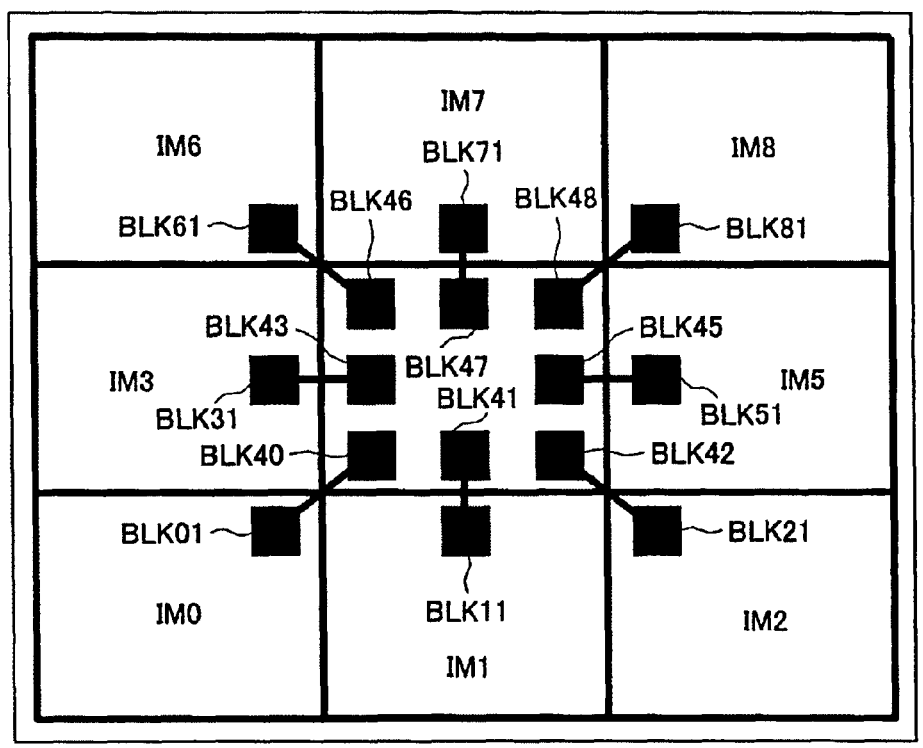
FIG. 14 is a diagram for explaining individual color corrections.

FIG. 14 is a diagram for explaining the individual color corrections.

Figure 15A:
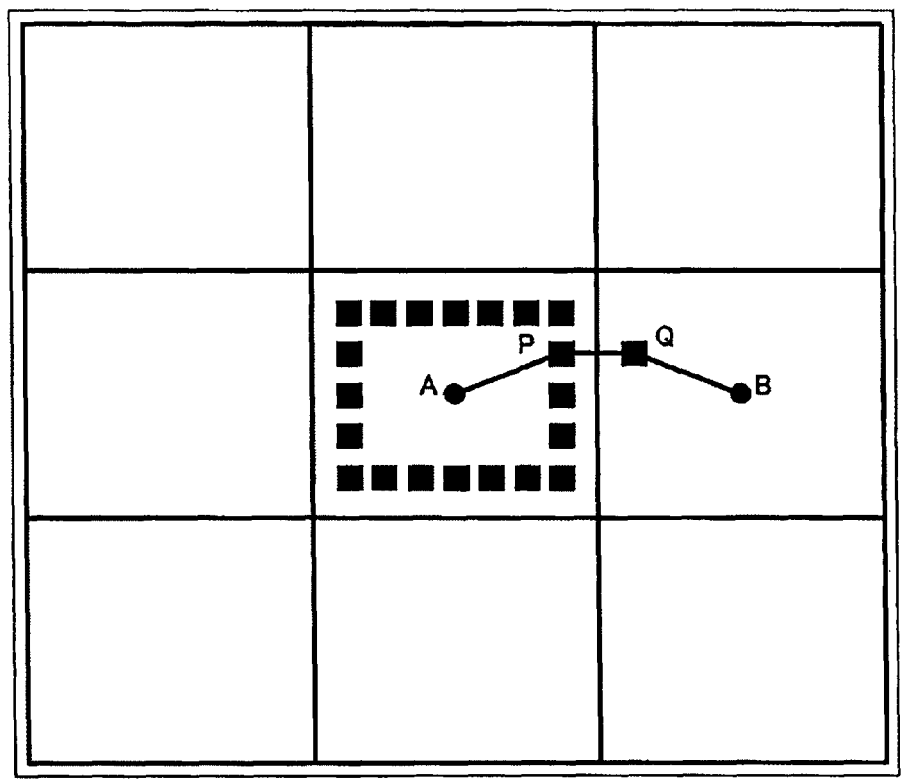
FIGS. 15A and 15B are diagrams for explaining a method of smoothly and automatically correcting boundaries.
Figure 15B:
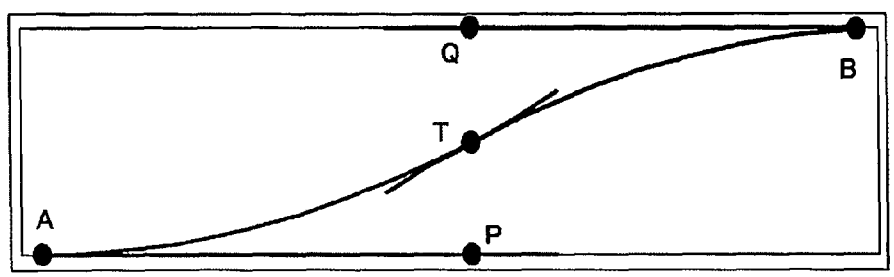

FIGS. 15A and 15B are diagrams for explaining a method of smoothly and automatically correcting boundaries.

In the example of FIG. 14, the luminance values of individual blocks are obtained by arranging eight rectangular, e.g. square blocks BLK40 to BL48 (except for BLK45) in the periphery of an image IM4 positioned centrally of 9 (3×3) images IM0 to IM8, so that they are opposed to images IM0 to IM3, IM5 to IM8, respectively, and by placing, in other images, square blocks BLK01, BLK11, BLK21, BLK31, BLK51, BLK61, BLK71 and BLK81.

The pixel values of the images are then corrected to minimize the luminance value difference between the corresponding blocks.

If a small gradation error remains in the ambient light reduction correction, there may occur the phenomenon that the brightness is changed vertically or laterally.

By using this error as an evaluation coefficient, the gradation error can be eliminated.

In the example of FIGS. 15A and 15B, 20 square blocks are arranged in the image IM4.

As shown in FIGS. 15A and 15B, in order to smoothly and automatically correct the boundaries, an average value of the pixel values of blocks P and Q is used as a target value T, and the correction for obtaining the target value T is made by a second-order curve, without changing the pixel values of centers A and B of the images IM4 and IM5, respectively.

A specific example of automatic color non-uniformity correction related to FIGS. 14 to 15B will be described below.
[First Processing Contents]
  A parameter is fetched.
  Size data (SIZE.DAT) are read.
  Eight squares are placed at a boundary by kidolpf( ), and
    the luminance values thereof are obtained.
  nlpf is the size of the square.
  kidobgr[ ][ ][ ][ ] Enter into (BGR,i,j, position).
  All images are processed.
  The kidobgr[ ][ ][ ][ ] is changed into a luminance signal,
    And the same value is entered into the three BGR by
    movey( ).
  The kidobgr[ ][ ][ ][ ] is copied at kidobgr2[ ][ ][ ][ ] by
    move( ).
(Hereinafter, the kidobgr[ ][ ][ ][ ] remains unchanged, whereas the kidobgr2[ ][ ][ ][ ] will be changed.)
  An error kidosa[ ][ ][ ] of the luminance values is obtained
    from the kidobgr2[ ][ ][ ][ ] by kidoer2( ).
  The kisosa[ ][ ][ ] is an amount for which a certain image
    should be shifted in a direction to reduce the difference with
    the ambient images.
  kidosamax is a maximum value of kidosa[ ][ ][ ] of all the
    images.
  It is an average of differences with the luminance values of
    the corresponding region of an object image. For a corner, the
    object is an obliquely adjacent image.
  "0" is entered into a brightness correction coefficient
    meiho[ ][ ][ ] by meiclr( ).
  Hereinafter, this repetition is continued.

A half of kidosa[ ][ ][ ] is added to meiho[ ][ ][ ] by meiadd().

Provided that the brightness of the reference image remains unchanged.

By inten(), kidobgr[ ][ ][ ][ ] is corrected with meiho [ ][ ] [ ], to create kidobgr2[ ][ ][ ][ ].

(Every time this is performed, the kidobgr2[ ][ ][ ][ ] and the meiho[ ][ ][ ] approach the right values, respectively.)

A luminance value error kidosa[ ][ ][ ] from kidobgr2[ ][ ] [ ][ ] is obtained by kidoer2( ).

(Every time this is performed, the kidosa[ ][ ][ ] approaches 0.)

This is repeated until the kidosamax <0.1 (kidosamax represents the maximum value of the absolute value of kidosa[ ][ ][ ].)

Here, meihodc[1] is an average value of brightness correction coefficients, meihox[1] is a lateral bias of the brightness correction coefficients, and meihoy[1] is a vertical bias of the brightness correction coefficients.

When the central deviation of ambient light reduction correction is incorrect, the vertical and lateral biases of the brightness correction coefficients are increased. Hence, rerun is performed after making a change so that the numerical value thereof approaches 0.

When meihox[1] and meihoy[1] is close to 0, the entire region is substantially flat.

[Second Processing Contents]

The boundary is smoothly color-corrected by eliminating the color non-uniformity to the limit.

A parameter is fetched.

Size data (SIZE.DAT) are read.

20 squares are placed at the boundary by kidolpf20A( ).

20 squares are placed at the boundary by kidolpf20( ), and pixel values thereof are obtained.

nlpf is the size of the square.

100 times value is entered into kidobgr[ ][ ][ ][ ] (BGR,i,j, position).

This is performed for all images.

Ambient fine adjustment magnification kidohi[h][i][j][10] is obtained by kidoer2C( ).

An average value between a subjective pixel value and an objective pixel value is used as a target value.

This is 1000 times value of a magnification, by which the subjective pixel value can reach the target value.

kidodata.txt is created by recdata12C().

10 times value of kidohi[h][i][j][20] is written in shuuhen- .text by recdata13C().

The ambient fine adjustment magnification written in the shuuhen.txt is used to correct the colors of the respective images.

These data are 20 discrete values. A linear value connecting these is determined by proportional distribution.

The procedure of this image processing is as follows.

The central pixel value 0(0,0) is not changed for all pixels P(xl, yl).

The intersection with a boundary line passing from 0 to P is expressed as Q(x2, y2).

Linear interpolation is performed from two ambient fine adjustment magnification data with Q interposed in between.

There is used a coefficient assuming that the pixel value is changed in proportion to the square of a distance from the center.

This processing is simultaneously performed with various types of color corrections, and written out in the MEI.

The contents of an example of characteristic processing in the smooth color correction will be described in detail below.

A correct value is inputted from MEIHOSEI.DAT.

A smooth correction value shu[n][h][i] is inputted from SHUUHEN.TXT.

(n: image number h: 20 points i=0:x i=1:y i=2:B i=3:G i=4:R)

Correction is made giving a black level, gamma, a white level, a saturation magnification, an ambient light reduction coefficient and MEIHOSEI.DAT.

In both x and y, the center of an image is the origin, and operation is performed for all the pixels.

"ang" indicates the direction of a line connecting (ys, xs) and the origin.

$$ang = a \tan 2(ys, xs)$$

The nearest two points poia and poib in 20 points are sought when the line extending from the origin in the direction of the ang crosses over the boundary line.

Letting the line connecting the two points poia and poib be y=a11*x+b11, a11 and b11 are found.

The coordinate of the intersection between this line and a line extending from the origin in the direction of the ang is found and written as xq, yq.

A coefficient k11 for proportional distribution is found, which indicates how xq and yd are far from poia and poib. (The coefficient is 0 when it is close to poia, and 1 when it is close to poib.)

The magnification gq[w] of BGR in the boundary area is obtained from the magnifications of poia and poib by proportional distribution.

Assuming that the color correction magnification can be lie on the equation of y=1+k22*r*r, which is proportional to the square of a distance from the origin, a coefficient k22[w] can be obtained by the following equation, since the magnification of the boundary area is gq[w].

$$k22[w] = (gq[w]1)/(xq*xq + yq*yq)$$

The following equation expresses a color correction magnification gp[w] of an arbitrary position (xs, ys).

$$gp[w] = 1 + k22[w]*(xs*xs + ys*ys)$$

Next, a description will be made of an example of the precise combining processing as an example of the above-mentioned configuration.

(1) Original images are reduced.

(2) Without any precise combining, the reduced images are combined by projecting them to a cylinder.

The center of the cylinder is the center of rotation of a biaxial active pan tilt head.

For example, when there is a limit on memory, the ordinate is handled as latitude, instead of height.

The data of the longitudes and latitudes of the optical axis directions of all the original images are given as the initial values in the text file.

(3) The ambient light reduction correction is performed to find a correction coefficient.

In the state where all the original images are arranged at their desired positions, a graph of the luminance values for each of RGB components is created, and the areas containing a small number of high frequency components in the luminance values in the overlapping region are picked up.

A blue sky or a white wall can be automatically detected.

This is because the ambient light reduction characteristics cannot be detected accurately in the area containing a large number of high frequency components.

A ambient light reduction correction function is a fourth-order function where a position (x1, y1) shifted vertically and laterally from the center of a screen is used as a reference, and second-order and fourth-order coefficients are given to the distance from that position.

The coefficients of this function are changed to minimize the luminance value difference in the overlapping region.

(4) A brightness correction per image is performed to find a correction coefficient.

Even for a complete ambient light reduction correction, in some cases, the appearance is not clear.

For example, correction is made when there is a luminance difference between the adjacent images, such as when shooting at high shutter speed under a fluorescent light.

It is necessary to use such a correction function as to uniformly reduce the errors in bright images and dark images.

(5) Using the correction coefficients obtained thus far, the ambient light reduction correction and the brightness correction per image are performed with respect to the original images not subjected to reduction. When the final output images are subjected to contrast enhancement, gamma correction, color density enhancement, these are handled by batch processing.

The precise combining is started from here. The positional relationship will be found from the images subjected to the respective processing of the ambient light reduction correction, brightness correction per image, contrast enhancement, gamma correction and color density enhancement.

The original images will be used from here.

(6) Four pieces having good condition at the center are selected, and the positional relationship of overlapping portions in the vertical and lateral adjacent images are obtained by image matching.

(7) These data are used to obtain lens distortion, a look down angle, an angle of view, and a step angle of a pan tilter.

(8) Four pieces having good condition at the upper and lower regions are selected, and the positional relationship of overlapping portions in the vertical and lateral adjacent images is obtained by image matching.

(9) These data are used to obtain more accurately the angle of view, the error and the nature of the step angle of the pan tilter.

As used here, the term "image having good condition" means an uneven image of strong contrast where the influence of parallax is neglectably remote, the depth is small, and there is no moving object.

A parameter common to all the images is obtained by the foregoing operations. Then, the entire stitching will be started.

For example, in the method where images as many as 102 pieces are connected one by one from an end, wrinkle will be accumulated, resulting in breakage.

Therefore, all of 80 boundaries in the 102 images are simultaneously monitored for adjusting the respective image positions to minimize their errors.

Here, the obstacle is the presence of poor condition boundaries.

If all the boundaries are of good condition, the processing with the already obtained parameter can almost completely eliminate the errors.

The reason for this is that only one camera has taken these images.

In fact, it is close to impossible that all the 80 boundaries in the 102 images are of good condition, and these boundaries often contain poor condition portions.

As used here, the term "poor condition" includes the following situations where (a) the luminance value is even, for example, in the sky or walls; (b) there is a normally moving object, such as a ruffled water surface, leaves swinging with wind, fluttering flags, flowing waterfalls and flowing clouds; (c) there is a moving object such as a person, a car, or a bird, and only one side of an overlapping region is taken or present at a different position; (d) a cloud shields the sun, and the brightness is changed, or a shadow formation is varied; and (e) a fence taken in a close range causes a deviation due to parallax.

It is highly desirable to achieve convergence only by the data of the correct positional relationship produced by accurately recognizing these poor condition portions and surely eliminating them.

The width of the lateral overlapping region is about 10% of a horizontal pixel number of 2560, that is, about 250 pixels.

The vertical size of the region is a vertical pixel number of about 1920 pixels.

This region is subjected to BM (block matching) process with a region of 64×64 as a unit.

When the right and left two pieces are vertically and laterally overlapped with each other only by translation, at least one significant block may be present in the overlapping region.

The case where there is a lateral deviation in the positional relationship between the upper and lower parts of the overlapping region means that the look down angle is deviated or the like.

The case where there is a vertical deviation in the positional relationship between the upper and lower parts of the overlapping region means that the right and left vertical sizes are different from each other.

The case where the positional relationship is arched not linear in the upper and lower and the middle of the overlapping region is due to the influence of lens distortion.

Accordingly, at least three significant blocks in the longer side direction of the overlapping region are needed to detect the lens distortion.

(10) Here, four blocks are arranged in the longer side direction in the right and left overlapping regions, and five blocks are arranged in the longer side direction of the upper and lower overlapping regions, respectively.

(11) A graph is created, on which the abscissa represents the longer side direction of the overlapping region and the ordinate represents deviations in the results of the BM. This is regarded as a parabola, based on the method of least squares, and the coefficient thereof is obtained.

The second-order coefficient is substantially zero by the lens distortion correction.

The first-order coefficient is substantially zero if the mechanical nature and the angle of view, the step angle, the look down angle are properly set.

The coefficient of the zero-order coefficient contains an error for finite mechanical precision.

For example, when a predetermined camera is provided with a 400 mm telephoto lens, a pixel is $1/968$ degrees, and the presence of an error of $1/100$ degrees results in a deviation of 10 pixels.

(12) Using the zero-order coefficient, the directions of all the images are changed to reduce the entire errors.

As described above, the present embodiment includes the first color correction functioning section 143, the combining functioning unit 144 and the second color correction functioning unit 145. The first color correction functioning unit 143 performs, when extracting a parameter such as a lens distortion correction coefficient, at least three BM per boundary, and performs combining for the boundaries in at least four pieces. Then, the unit 143 determines a lens distortion correction coefficient so as to achieve the precise combining. That is, the section 143 extracts from the original images a parameter such as a lens distortion correction coefficient, and uniformly performs the ambient light reduction correction, the contrast enhancement, the saturation enhancement and the gamma correction with respect to all partial images. After determining the parameter such as the lens distortion correction coefficient, and performing the ambient light reduction correction, the contrast enhancement, the saturation enhancement and the gamma correction, the combining functioning section 144 performs the BM of at least one (three in the present embodiment) for each boundary. Then, the section 144 performs precise combining for reducing errors in a plurality of images by simultaneously evaluating the results of the BM on all the boundaries, and updating the direction of the optical axis so as to reduce the errors in all the boundaries. The second color correction functioning unit 145 performs the color (color non-uniformity) correction, which is performed independently for each partial image in order to reduce color difference between adjacent images in the plurality of images precisely combined by the combining functioning unit 144. The second color correction functioning unit 145 also performs the color correction for reducing the color discontinuity between the adjacent images to below the detection limit.

This enables the precise combining and also suppresses the occurrence of color non-uniformity, irrespective of the number of images.

The lens distortion correction coefficient can be extracted from actually shot images. This eliminates the necessity of complicated calibration operation, remarkably improving precision.

With the method causing no wrinkle even when connecting several thousands of pieces, the necessary range can be taken at the necessary resolution, without paying attention to the number of shots.

Although the present embodiment has described the case where the processing in the first color correction functioning unit 143, the processing in the combining functioning unit 145, and the processing in the second color correction functioning section 146 are performed in the order named, without limitation, various manners are applicable. For example, the color correction may be made after performing the precise combining to some extent.

It should be understood by those skilled in the art that various modifications, combinations, sub-combinations and alternations may occur depending on design requirements and other factors insofar as they are within the scope of the appended claims or the equivalents thereof.

The present application claims benefit of priority of Japanese patent Application No. 2006-300917 filed in the Japanese Patent Office on Nov. 6, 2006, the entire content of which being incorporated herein by reference.

What is claimed is:

1. An image processing apparatus comprising:
a circuit configured to combine a plurality of partial images into a combined image, by:
   extracting at least one parameter including a lens distortion coefficient from a subset of the plurality of partial images, wherein at least two of the partial images in the subset are disposed to overlap, by performing a block matching process for each pair of partial images in the subset disposed to overlap; and
   combining the plurality of partial images into the combined image based at least in part on the at least one extracted parameter, the combining comprising:
      performing, based at least in part on the extracted lens distortion coefficient, the block matching process for at least one pair of partial images in the plurality of partial images to be combined to obtain corresponding boundary errors, and
      updating an optical axis direction to reduce the corresponding boundary errors, wherein the plurality of partial images is obtained from a plurality of image-captures by the image processing apparatus.

2. The image processing apparatus according to claim 1, wherein performing the block matching process for a pair of partial images disposed to overlap comprises performing the block matching process for each of at least three blocks in a region of overlap between the pair of partial images to account for non-linear distortions due to lens distortion.

3. The image processing apparatus according to claim 1, wherein the circuit makes the block matching process converge by parallel translation of partial images except for a reference image to minimize the boundary errors.

4. The image processing apparatus according to claim 1, wherein the circuit is configured to uniformly perform ambient light reduction correction, contrast enhancement, saturation enhancement, and gamma correction with respect to all partial images to be combined.

5. The image processing apparatus according to claim 1, wherein the circuit is configured to independently perform, after combining, color correction with respect to all partial images in order to reduce color differences between adjacent partial images.

6. The image processing apparatus according to claim 1, wherein the circuit is configured to perform a color correction for reducing color discontinuity between adjacent partial images to below a detection limit after combining.

7. A camera apparatus comprising:
an image-capturing device;
an optical system configured to focus an object image onto the image-capturing device; and
an image processing apparatus configured to process an output image signal of the image-capturing device, the image processing apparatus including a combining processing unit configured to combine a plurality of partial images into a combined image by:
   extracting at least one parameter including a lens distortion coefficient from a subset of the plurality of partial images, wherein at least two of the partial images in the subset are disposed to overlap, by performing a block matching process for each pair of partial images in the subset disposed to overlap; and
   combining the plurality of partial images into the combined image based at least in part on the at least one extracted parameter, the combining comprising:
      performing, based at least in part on the extracted lens distortion coefficient, the block matching process for each pair of partial images in the plurality of partial images to be combined to obtain corresponding boundary errors, and updating an optical axis direction to reduce boundary errors,
   wherein the plurality of partial images is obtained from a plurality of image-captures by the image processing apparatus.

8. The camera apparatus according to claim 7, wherein the combining processing unit is configured to make the block matching process converge by parallel translation of partial images except for a reference image so as to minimize the boundary errors.

9. The camera apparatus according to claim 7, wherein the combining processing unit is configured to uniformly perform ambient light reduction correction, contrast enhancement, saturation enhancement, and gamma correction with respect to all partial images to be combined.

10. The camera apparatus according to claim 7, wherein the combining processing unit is configured to independently perform, after combining, color correction with respect to all partial images to reduce color differences between adjacent partial images.

11. The camera apparatus according to claim 7, wherein the combining processing unit is configured to perform a color correction of reducing color discontinuity between adjacent partial images to below a detection limit after combining.

12. An image processing method of combining a plurality of partial images taken at a plurality of times in different directions from a point into a combined image, the method comprising:
extracting at least one parameter including a lens distortion coefficient from a subset of the plurality of partial images, wherein at least two of the partial images in the subset are disposed to overlap, by performing a block matching process for each pair of partial images in the subset disposed to overlap; and
combining the plurality of partial images into the combined image based at least in part on the at least one extracted parameter, the combining comprising:
performing, based at least in part on the parameter, the block matching process for each pair of partial images in the plurality of partial images to be combined to obtain corresponding boundary errors, and
updating an optical axis direction to reduce the corresponding boundary errors.

13. A memory coupled to a circuit, the memory storing a program for combining a plurality of partial images taken at a plurality of times in different directions from a point into a combined image, the program causing the circuit to perform:
extracting at least one parameter including a lens distortion coefficient from a subset of the plurality of partial images, wherein at least two of the partial images in the subset are disposed to overlap, by performing a block matching process for each pair of partial images in the subset disposed to overlap; and
combining the plurality of partial images into the combined image based at least in part on the at least one extracted parameter, the combining comprising:
performing, based at least in part on the extracted lens distortion coefficient, a block matching process for each pair of partial images in the plurality of partial images to be combined to obtain corresponding boundary errors, and
updating an optical axis direction to reduce the corresponding boundary errors.

14. The image processing apparatus of claim 1, wherein the boundary errors comprise at least one of a tilting error, a translation error, and/or a rotation error.

15. The image processing apparatus of claim 1, wherein the circuit is further configured to combine the plurality of partial images into the combined image by projecting partial images in the plurality of partial images to a cylinder.

16. The camera apparatus of claim 7, wherein the combining further comprises projecting partial images in the plurality of partial images to a cylinder.

17. The image processing method of claim 12, further comprising projecting partial images in the plurality of partial images to a cylinder.

18. The memory of claim 13, wherein the program further causes the circuit to perform: projecting partial images in the plurality of partial images to a cylinder.

* * * * *